US006575290B2

(12) United States Patent
Löning et al.

(10) Patent No.: US 6,575,290 B2
(45) Date of Patent: Jun. 10, 2003

(54) AUTOMATIC EMPTY CONTAINER RETURN MACHINE EQUIPPED WITH SELF-CLEANING ARRANGEMENT

(75) Inventors: Johann Löning, Oldenburg (DE); Siegmar Hecht, Ilmenau (DE)

(73) Assignee: Prokent AG, Ilmenau (DE)

( * ) Notice: Subject to any disclaimer, the term of this patent is extended or adjusted under 35 U.S.C. 154(b) by 26 days.

(21) Appl. No.: 09/840,941

(22) Filed: Apr. 24, 2001

(65) Prior Publication Data

US 2002/0011260 A1 Jan. 31, 2002

(30) Foreign Application Priority Data

Apr. 29, 2000 (EP) ............................................ 00109317

(51) Int. Cl.[7] ................................................ B65G 45/00
(52) U.S. Cl. ........................ 198/495; 198/494; 198/496
(58) Field of Search ................................ 198/494, 495, 198/496; 209/522, 523

(56) References Cited

U.S. PATENT DOCUMENTS

| | | | | |
|---|---|---|---|---|
| 2,855,094 A | * 10/1958 | Zebarth | ...................... | 198/495 |
| 4,331,227 A | * 5/1982 | Risley | ........................ | 198/443 |
| 4,691,231 A | * 9/1987 | Fitzmorris et al. | .......... | 209/522 |
| 4,839,067 A | * 6/1989 | Jansen | ........................ | 198/495 |
| 4,860,883 A | * 8/1989 | Knaul et al. | ................ | 198/495 |
| 4,960,200 A | * 10/1990 | Pierce | ........................ | 198/495 |
| 5,355,992 A | * 10/1994 | Baig et al. | .................. | 198/495 |
| 5,372,243 A | * 12/1994 | King | .......................... | 198/495 |
| 5,542,525 A | * 8/1996 | Kornely | ...................... | 198/495 |
| 5,598,915 A | * 2/1997 | Malmberg et al. | .......... | 198/495 |
| 5,613,594 A | * 3/1997 | Kootsouradis | ............. | 15/256.5 |
| 5,649,616 A | * 7/1997 | Stecklow | .................... | 198/495 |
| 5,678,696 A | * 10/1997 | Goetz | ......................... | 194/209 |
| 5,688,693 A | * 11/1997 | Fine et al. | | |
| 6,050,392 A | * 4/2000 | Straub | | |
| 6,155,408 A | * 12/2000 | Heuft et al. | | |
| 6,244,423 B1 | * 6/2001 | Tacchi et al. | | |
| 6,302,263 B1 | * 10/2001 | Bennett et al. | | |

* cited by examiner

*Primary Examiner*—Khoi H. Tran
(74) *Attorney, Agent, or Firm*—Flanagan & Flanagan; John R. Flanagan

(57) ABSTRACT

An automatic empty container return machine includes a detection unit operable for identifying whether or not an empty container is of a predetermined category, an input unit located upstream of the detection unit for receiving empty containers to supply the empty containers to the detection unit, an output unit located downstream of the detection unit for receiving empty containers that have been identified by the detection unit as being of the predetermined category, a transport stage having a conveyor for transporting empty containers from the input unit through the detection unit to the output unit, and a self-cleaning arrangement having components integrated with at least one of the input unit, detection unit, output unit and transport stage and being operable at selected times to clean surfaces thereof that are preselected to be cleaned.

18 Claims, 3 Drawing Sheets

AUTOMATIC EMPTY CONTAINER RETURN MACHINE EQUIPPED WITH SELF-CLEANING ARRANGEMENT

BACKGROUND OF THE INVENTION

1. Field of the Invention

The present invention relates to an automatic return machine for empty containers and, more particularly, is concerned with an automatic empty container return machine equipped with a self-cleaning arrangement for performance of cleaning of the machine.

2. Description of the Prior Art

In German patent document No. DE 195 08 388 A1, there is disclosed a system for processing reusables which employs an automatic return machine for processing reusable containers, in particular, reusable cups. After consuming a drink, a consumer supplies the used cup to the automatic return machine in which the cup is tested for system conformity. If the cup is detected as being within the scope of the reusables system, return of the cup deposit money to the consumer takes place. The automatic return machine places such reusable cups in magazine type tubes or cases which are then transported to a separate service center. At the separate service center, the reusable cups are transported by a conveyor through a rinsing station equipped with spray nozzles and a drying device equipped with hot-air fans where the cleaning and drying of the reusable cups takes place. The cleaned and dried reusable cups are subsequently collected and transported back to automatic vending machines for reuse with drinks dispensed from such machines.

In European patent document No. EP 0 442 027 A2, there is disclosed an arrangement for the recovery of recyclable material from disposable packaging, in particular, disposable bowls made of aluminum or synthetic material. The disposable bowls traverse a conveying stage in which they are cleaned by spray jets from above and below. After traversing the cleaning stage, the disposable bowls arrive at a compression station where their volume is significantly reduced. The compacted disposable bowls subsequently fall into a collection container in order to be supplied to a recycling process.

In European patent document No. EP 0 774 738 A2, there is disclosed a device for treating glasses, cups and the like. This treating device corresponds substantially to the reusables processing system of the abovecited German patent document No. DE 195 08 388 A1, with the difference being that here the cleaning stage for used drink containers is integrated into the device and thus is not placed separately from it.

Other automatic return machines for empty containers of the type relevant to the present invention herein are known, for example, from the following publications: WIPO patent document Nos. WO 93/25981 and WO 93/03460; European patent document Nos. 0 561 148 B1 and 0 612 046 A1; German patent document Nos. DE 43 18 388, DE 44 43 406, DE 36 05 921, DE 196 13 099 A1, DE 37 15 815 A1, DE 93 21 439 U1 and DE Gbm 73 12 603; U.S. Pat. No. 5,085,308; and U.K. patent document no. GB1 552 927. These automatic machines are primarily employed in central markets, department stores or drink markets and make possible the automatic return of empty containers such as bottles and cases of bottles, cans, cups, bowls, etc.

Each of these machines comprises at least one input unit, via which the individual empty containers are supplied in either standing or lying condition or also in empty container cases for further processing. Depending on the structure of the automatic machine, an isolating unit can succeed the input unit, in which containers inserted individually are spaced apart from one another before they pass through the detection unit. These detection units work with mechanical sensors, light barriers, laser arrangements, camera measuring technique, etc. and serve for acquiring the type of a particular container. If a container is detected as not belonging to the return assortment class it is sorted out in a sorting unit and supplied to, for example, a return chute or a collection container for such containers. In the event of deposit-due empty containers, apart from the qualitative acquisition, in the detection unit a quantitative acquisition of the containers takes place. These data are supplied to a control unit which calculates the deposit and initiates, for example, the output of a deposit coupon. At the end of the processing, the containers or also the container cases are transported out of the automatic machine into an output unit and conducted to a collection site belonging to the logistics system for empty containers.

In the automatic machine, transport stages are provided on which the containers are conveyed from unit to unit. The transport stages can be, for example, conveyor belts, slides, chutes and gripper arms.

Since, as a rule, the empty containers contain residual liquids, which can flow out during the handling of the empty containers in the automatic return machine, after a certain length of operation heavy contaminations of the processing units, transport stages, sensors, etc. can occur which impair the functional capabilities of the automatic return machine. According to the prior art, the automatic return machines are therefore manually cleaned at specific time intervals. This is very expensive and also difficult given the cramped conditions of space in the automatic return machine, such that the quality of the cleaning suffers. Moreover, during this cleaning activity, installations in the automatic return machine could be damages.

SUMMARY OF THE INVENTION

The present invention overcomes the aforementioned problems by providing an automatic return machine of the above-stated type being equipped with a cleaning arrangement for performance of self-cleaning of the automatic return machine, which cleaning arrangement is integrated into the machine. The cleaning arrangement is provided constructionally with the machine so that even sites normally difficult to access can be reached. Problems due to cramped space are eliminated since the cleaning arrangement is already disposed at its intended location. Such prepositioning of the cleaning arrangement on the machine permits optimal and efficient cleaning of the machine and avoidance of the type of damage that is possible with manual cleaning. In addition, working time is saved since the automatic return machine, in effect, cleans itself.

The activation of the self-cleaning arrangement of the automatic return machine can be realized in several different ways. For one, fixed cleaning intervals can be provided and the invention, in connection with a time circuit, offers the option of scheduling the cleaning at a time which is outside of normal working hours, for example, during nighttime hours.

Also possible is cleaning as needed, wherein the degree of contamination can be determined by manual inspection or also, in an advantageous implementation of the present invention, automatically through sensors. The data sensed by the sensors can be transferred to a central control unit of the machine which, at a predetermined degree of contamination, stops the normal operation of the machine and initiates the self-cleaning process. If several machines are available in a supermarket or the like, the consequences of placing a machine out of operation can be managed by switching over to another machine so that the operation of the self-cleaning arrangement can take place immediately on the contaminated machine. Otherwise, given the corresponding programming, the operation of the self-cleaning arrangement can be offset in time, for example, by being shifted into nighttime hours.

In further implementation of the present invention, the cleaning arrangement comprises nozzles to act upon the surfaces to be cleaned with a cleaning medium, wherein additionally brushes can be provided which rest in contact on the surfaces to be cleaned and can be moved translationally, rotationally and/or oscillatingly or can also stand still if the surfaces, for example, of a conveyor belt are guided past them. The cleaning medium is conducted via the nozzles at low- or high-pressure onto the parts to be cleaned such that contamination is rinsed off, with available brushes supporting this cleaning process. Possible cleaning media are, as examples, water or other liquids in cold or heated condition, mixtures of water and cold-cleaning agents, liquid mist with ultrasound turbulence and hot steam.

It is further of advantage if the parts to be cleaned are provided with a special surface coating, which ensures low adhesion of dust and dirt particles, for example, coatings which are applied by means of nanotechnology. For the complete removal of liquid residues, fans can be employed which blow warm or cold air onto the parts to be cleaned.

To protect sensitive components, for example electronic components, in further implementation of the invention it is of advantage if the areas of the automatic return machine to be cleaned are encapsulated by a tubular envelope to screen off remaining areas where sensitive components may be located such that these components in the remaining areas do not come into contact with the cleaning medium and dissolved dirt particles. In order not to impair the functional capability of light barriers, optical sensors and image detection devices, the encapsulating envelope, within the range of effectiveness of these devices, is implemented to be light-transmissive.

In an embodiment of the invention, the self-cleaning arrangement also comprises collecting tubs for the cleaning medium and removed dirt are disposed below the areas to be cleaned. It is useful if these collecting tubs are provided as an integral part of the encapsulating envelope enclosing the areas to be cleaned, such as a lower closure of thereof. Lastly, it is reasonable to provide the collecting tubs with a drain via which the contaminated cleaning medium can be drained off and supplied, for example, to a reprocessing system.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
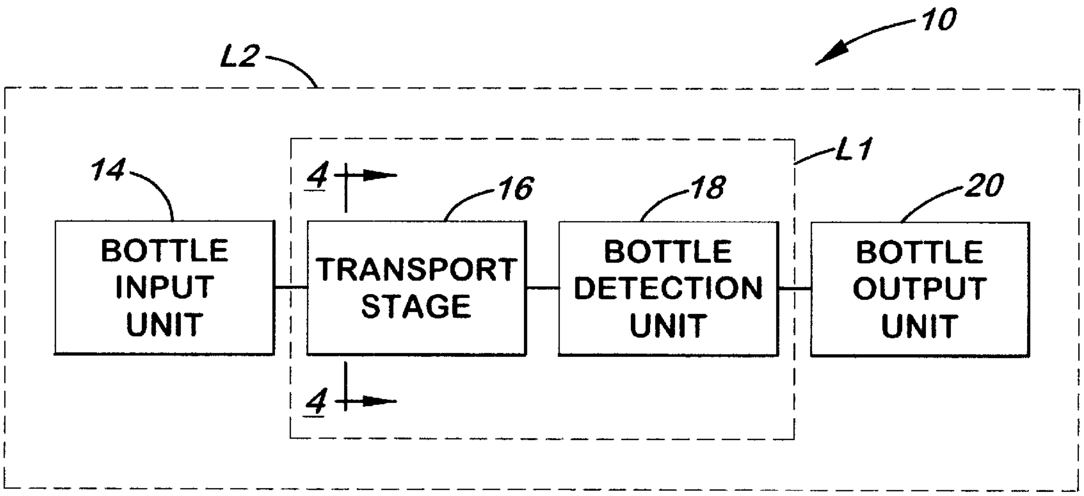
FIG. 1 is a schematic flow chart of a first embodiment of an automatic return machine of the present invention for bottles inserted in a lying position.
Figure 4:
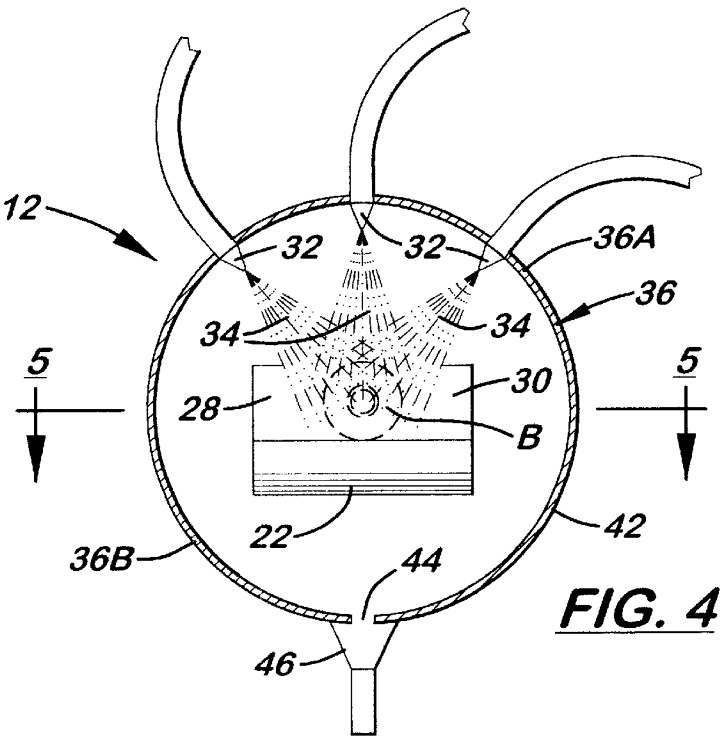
FIG. 4 is a schematic sectional view of a transport stage of the machine taken along line 4—4 of FIG. 1.
Figure 5:
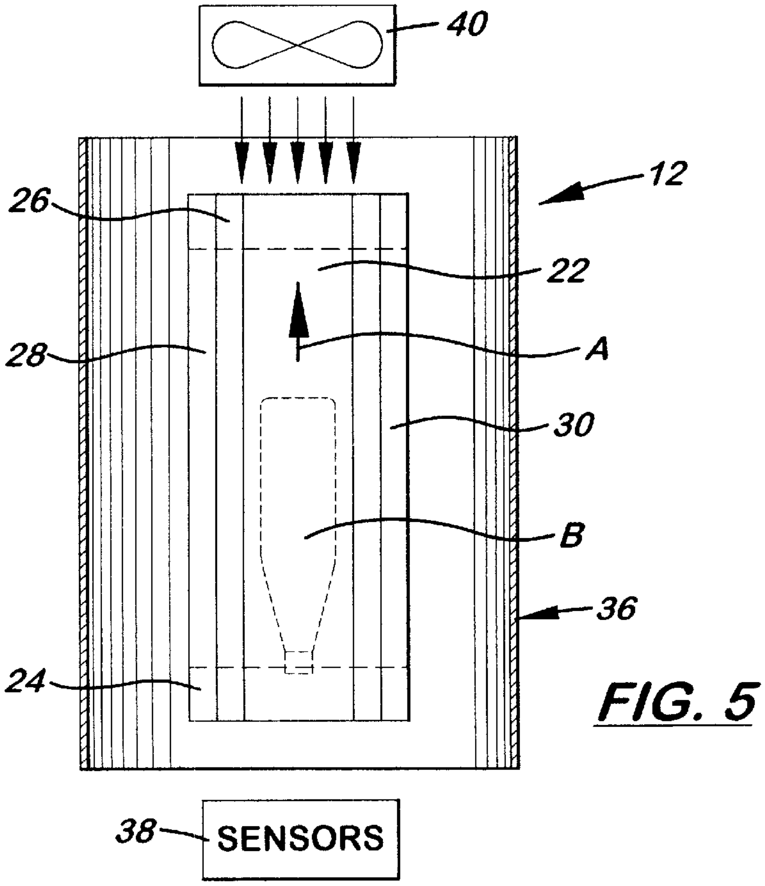
FIG. 5 is another schematic sectional view of the transport stage of the machine taken along line 5—5 of FIG. 4.

Referring to the drawings and particularly to FIGS. 1, 4 and 5, there is illustrated in FIG. 1 a schematic flow chart representing a first embodiment of an automatic bottle return machine, generally designated 10, adapted for processing containers in the form of bottles B, as shown in dot-dash line form in FIGS. 4 and 5, and being equipped with a self-cleaning arrangement 12, as shown in FIGS. 4 and 5, in accordance with the present invention. The machine 10 includes a bottle input unit 14, a transport stage 16, a bottle detection unit 18, and a bottle output unit 20. The bottle input unit 14 can be, for example, a turnstile (not shown) with an oblique axis and compartments in which bottles are placed individually in an inclined, or obliquely, downward orientation with the opening of the bottle pointing toward the operator. From the bottle input unit 14 the bottles B arrive at the transport stage 16 which is implemented as a conveyor belt 22 being shown in FIGS. 4 and 5. The conveyor belt 22 transports each bottle B past the bottle detection unit 18 which, for example, optoelectronically determines whether or not each bottle B is a deposit-due bottle. Bottles B on which the bottle detection unit 18 determines that no deposit is due are sorted out of the usual transport path by a sorting unit (not shown) of the machine 10. After passing the bottle detection unit 18, the deposit-due bottles B leave the machine 10 via the bottle output unit 20. The bottle output units 20, as a rule, are transporting or conveying devices such as, for example, conveyor belts or slides which transport the bottles B to a placement surface (not shown).

As seen in FIG. 1, alternative areas of the machine 10 that are encompassed by different versions of the self-cleaning arrangement 12 are shown symbolically by dashed lines L1 and L2. The area L1 is smaller than the area L2. The smaller area L1 encompassed by the self-cleaning arrangement 22 includes the transport stage 16 and bottle detection unit 18 and is an economy version of the self-cleaning arrangement 12. It is assumed that in the bottle input unit 14 and bottle output unit 20 of the machine 10 less contamination will occur or that these units, by being disposed on the periphery of the machine 10, can readily be cleaned manually. The larger or expanded area L2 encompassed by the self-cleaning arrangement 12 includes all of the units of the machine 10 coming into contact with the bottles B and thus is a full version of the self-cleaning arrangement 12.

Referring to FIGS. 4 and 5, the transport stage 16 of the machine is shown equipped with the self-cleaning arrangement 12 in accordance with the present invention. The transport stage 16 includes spaced apart front and rear rollers 24, 26 and the previously-mentioned conveyor belt 22 which runs over the rollers 24, 26. Each bottle B while lying on an upper section of the conveyor belt 22 is conveyed in the direction of arrow A from the bottom input unit 14 to and past the bottle detection unit 18. The transport stage 16 also includes a pair of flanks 28, 30 stationarily disposed along and above opposite side edge portions of the conveyor belt 22. Each bottle B is laterally guided the flanks 28, 30 as the bottle B travels between the flanks 28, 30 on the conveyor belt 22 and the conveyor belt 22 passes below the flanks 28, 30.

As seen in FIGS. 4 and 5, the self-cleaning arrangement 12 includes nozzles 32, a cleaning medium 34 supplied from any suitable source (not shown) to the nozzles 32, and means 36 for encapsulating the transport stage 16, for example, in the form of a tubular envelope which extends along and about the transport stage 16 so as to screen the surrounding areas of the machine 10 from the encapsulated areas of the machine 10. The nozzles 32 are disposed in an upper portion 36A of the tubular encapsulating envelope 36 and directed toward the conveyor belt 22 and flanks 28, 30 such that the cleaning medium 34 is sprayed or injected by the nozzles 32 onto the conveyor belt 22 and flanks 28, 30. The cleaning medium 34 can be water, preferably warm water, mixed with a cleaning agent. At a corresponding pressure of the cleaning medium 34, a thorough cleaning of the contaminated surfaces of the transport stage 16 takes place as caused by streams of the cleaning medium 34 jetting from the nozzles 32. The tubular encapsulating envelope 36 ensures that no spray of cleaning medium 34 splattered onto or reaches the surrounding areas of the transport stage 16 where sensitive devices, for example electronic devices, are located which could be destroyed or at least functionally impaired through contact with the cleaning fluid.

It should be noted here that in the self-cleaning mode of the machine 10, no bottles B are located within at least the transport stage 16 of the machine 10. Preferably, in the self-cleaning mode the machine 10 is run empty of bottles B. A bottle B is only depicted in dot-dash line form in FIGS. 4 and 5 for the purpose of showing that the transporting of a bottle B occurs while the bottle B is in a lying position.

When the desired cleaning effect on the transport stage 16 of the machine 10 has been attained by the self-cleaning arrangement 12, which can be detected, for example, through sensor(s) 38, the supply of cleaning medium 34 via the nozzles 32 is terminated. Residual cleaning fluid 34 remaining on the conveyor belt 22 and flanks 28, 30 drips off under the effect of gravity. In order to accelerate this process, the self-cleaning arrangement 12 also can include a fan 40 which is operated to blow warm air obliquely from above the transport stage 16 onto the previously cleaned surfaces thereof.

A lower portion 36B of the tubular encapsulating envelope 36, in addition to its above-described screening effect, provides means in the form of a tub 42 of the self-cleaning arrangement 12 for collecting cleaning medium 34 contaminated by with rinsed-off dirt particles. The tub 42 has one or more drainage openings 44 formed therein through which the collected contaminated cleaning medium 34 is supplied to a tube system 46 which is incorporated into a separator (not shown) for the treatment of the contaminated cleaning fluid.

Figure 6:
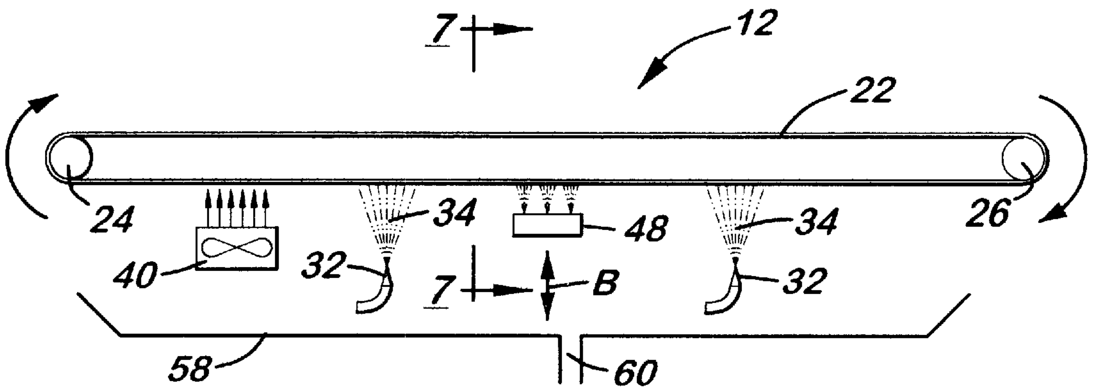
FIG. 6 is a schematic sectional view of a transport stage of the machine of FIG. 3.

In the case of the smaller self-cleaning area L1 depicted in FIG. 1, the self-cleaning arrangement 12 further includes another tubular encapsulating envelope, substantially the same as the envelope 36 described above, which encompasses the bottle detection unit 18 such that the envelopes 36 of the transport stage 16 and bottle detection unit 18 seamlessly merge one into the other. The self-cleaning arrangement 12 also includes additional cleaning nozzles 22 and, optionally, cleaning brushes 48 (such as shown in FIG. 6 with respect to the third embodiment of the machine 10) disposed in the area of the bottle detection unit 18. Since in its operation, the bottle detection unit 18 utilizes light beams and includes optical components, such as light barriers, optical sensors and image detection devices, the tubular encapsulating envelope 36 must be light-transmissive at least in the areas of beam penetration. This can be realized through corresponding windows, for example comprised of acrylic glass. It is understood that it is also possible to form the entire envelope 36 such that it is transparent.

In the case of the expanded self-cleaning area L2 depicted in FIG. 1, the entire passage of the bottles B through the machine 10 can be chambered by a tubular encapsulating envelope 36 as described above.

Figure 2:
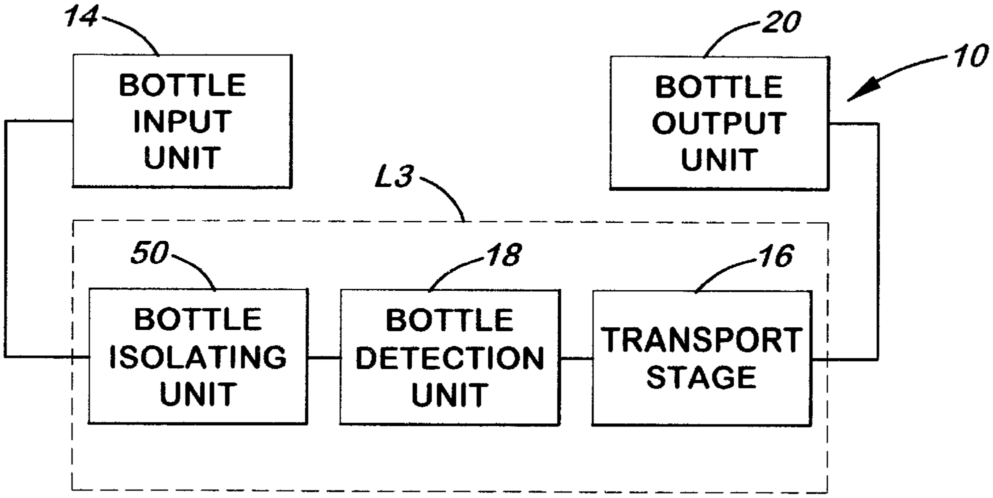
FIG. 2 is a schematic flow chart of a second embodiment of an automatic return machine of the present invention for bottles inserted in a standing position.

Referring to FIG. 2, there is illustrated another schematic flow chart representing a second embodiment of the automatic bottle return machine, generally designated 10, adapted for processing containers in the form of bottles while emplaced in their standing positions and equipped with the above-described self-cleaning arrangement 12, as shown in FIGS. 4 and 5, in accordance with the present invention. Here, with the bottles emplaced and transported in their standing positions by the transport stage 16, it is required to isolate them, i.e., to space them apart from one another, in order to ensure the faultless operation of the bottom detection unit 18. Thus, in the second embodiment the machine 10 additionally includes a bottle isolating unit 50. The area of the machine 10 encompassed by the self-cleaning arrangement 12 in the second embodiment of the machine 10 is symbolically indicated by dashed lines L3 in FIG. 2. The bottle transport stage 16, bottle detection unit 18 and bottle isolating unit 50 of the second embodiment of the machine 10 of FIG. 2 are equipped or integrated in a similar manner with the same components of the self-cleaning arrangement 12 as described above in connection with the first embodiment of the machine 10 of FIGS. 1, 4 and 5. It should be noted here that, although not shown, the transport stage 16 can also be provided between the bottle isolating unit 50 and bottle detection unit 18. The bottle input and output units 14, 20 are excluded from the self-cleaning area L3 in the second embodiment of the machine 10 for the same reason as in the case of the smaller area L1 of the first embodiment of the machine 10.

Figure 3:
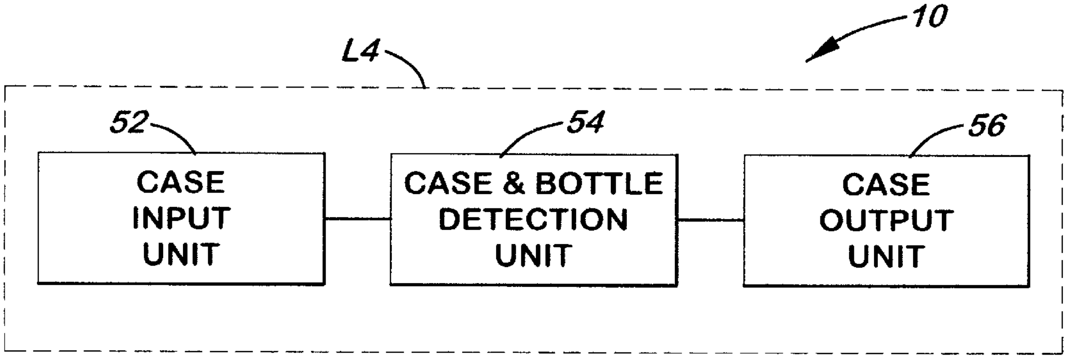
FIG. 3 is a schematic flow chart of a third embodiment of an automatic return machine of the present invention for cases of bottles.
Figure 7:
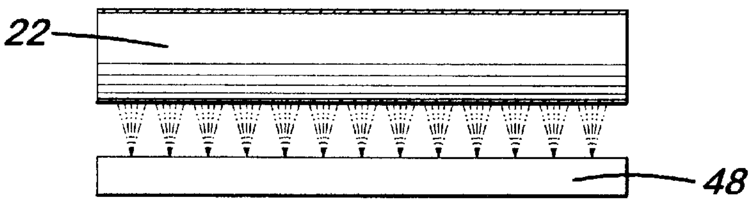
FIG. 7 is a schematic sectional view of the transport stage of the machine taken along line 6—6 of FIG. 6.

Referring now to FIGS. 3, 6 and 7, there is illustrated in FIG. 3 still another schematic flow chart representing a third embodiment of the automatic bottle return machine, generally designated 10, adapted for processing containers in the form of bottle cases and equipped with the self-cleaning arrangement 12, as now shown in FIGS. 6 and 7, in accordance with the present invention. In many automatic return machines the single bottle acceptance and the bottle case acceptance are accommodated jointly in one housing wherein in an upper area of the machine is provided the single bottle stage and in a lower area the case stage. In the third embodiment of FIGS. 3, 6 and 7, the machine 10 includes a conveyor belt 22 passing from the front side up to the rear side of the machine 10 and on which the bottle cases are conveyed from the case input unit 52 via the case and bottle detection unit 54 to the case output unit 56. The self-cleaning arrangement 12 is provided in the third embodiment below the lower section of the conveyor belt 22. The self-cleaning arrangement 12 includes nozzles 32 spaced apart from one another, via which the cleaning medium 34 is jet-sprayed onto the conveyor belt 22. Between the nozzles 32, a brush 48 is disposed which extends over the entire width of the conveyor belt 22, as is evident in FIG. 7. The brush 48 can be moved toward and away from the conveyor belt 22, as indicated by an arrow B. When the machine 10 is switched to a self-cleaning mode, the brush 48 is moved automatically upwardly such that its bristles are brought into contact on the lower section of the conveyor belt 22. Simultaneously, the nozzles 32 spray cleaning medium 34 thereon. A fan 40 is disposed downstream of the nozzles 32 relative to the direction of movement of the lower section of the conveyor belt 22 and blows warm air onto the conveyor belt 22 in order to eliminate the residual liquid therefrom. Underneath the conveyor belt 22 is disposed a collecting tub 58 which has a drain 60 for draining away from the tub 58 the collected contaminated cleaning medium 34.

In the third embodiment of the machine 10, the entire area symbolically indicated by dashed lines L4 in FIG. 3, wherein the bottle cases pass through the machine 10, is encompassed by the above-described components of the self-cleaning arrangement 12. An encapsulation, as provided in the preceding first and second embodiments, is not absolutely necessary in the third embodiment since the conveyor belt 22 already ensures a covering overhead. If appropriate, additionally overhead coverings can be provided along the opposite sides of the conveyor belt 22.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An automatic empty container return machine, comprising:

(a) a container detection unit operable for identifying whether or not an empty container is of a predetermined category;

(b) a container input unit located upstream of said container detection unit and having surfaces for receiving empty containers to supply the empty containers to said container detection unit;

(c) a container output unit located downstream of said container detection unit and having surfaces for receiving empty containers that have been identified by said container detection unit as being of the predetermined category;

(d) a container transport stage having surfaces and means for conveying empty containers at least from said container input unit to said container detection unit; and (e) a self-cleaning arrangement having components integrated with at least one of said container input unit, container output unit, container detection unit and container transport stage and being operable at selected times to clean said surfaces of said at least one of said container input unit, container output unit and container transport stage that are preselected to be cleaned;

(f) said components of said self-cleaning arrangement including a sensor for inspecting said surfaces preselected to be cleaned to determine whether or not said surfaces are clean.

2. The machine of claim 1 wherein said components of said self-cleaning arrangement include at least one nozzle for injecting a cleaning medium upon said surfaces preselected to be cleaned.

3. The machine of claim 2 wherein said components of said self-cleaning arrangement further include at least one brush for contacting said surfaces preselected to be cleaned.

4. The machine of claim 2 wherein said components of said self-cleaning arrangement further include at least one fan for blowing air to dry said surfaces that have been cleaned by said cleaning medium injected from said nozzle.

5. The machine of claim 2 wherein said components of said self-cleaning arrangement further include an elongated tub underlying said nozzle and said surfaces for collecting and conducting away cleaning medium that has been contaminated by the cleaning of said surfaces.

6. The machine of claim 2 wherein said components of said self-cleaning arrangement further include means for encapsulating said nozzle and said surfaces so as to screen remaining areas of said machine that are not to be cleaned from contact by said cleaning medium.

7. The machine of claim 6 wherein said encapsulating means is an elongated tubular envelope.

8. The machine of claim 7 wherein a lower portion of said elongated tubular envelope forms an elongated tub that underlies said nozzle and said surfaces for collecting and conducting away cleaning medium that has been contaminated by the cleaning of said surfaces.

9. An automatic empty container return machine, comprising:

(a) a container detection unit having components operable for identifying whether or not an empty container is of a predetermined category;

(b) a container input unit located upstream of said container detection unit for receiving empty containers to supply the empty containers to said container detection unit;

(c) a container output unit located downstream of said container detection unit for receiving empty containers that have been identified by said container detection unit as being of the predetermined category;

(d) a container transport stage having means for conveying empty containers from said container input unit through said container detection unit to said container output unit, said conveying means having surfaces; and (e) a self-cleaning arrangement having components integrated with at least said conveying means of said container transport stage and being operable at selected times to clean said surfaces of said conveying means that are preselected to be cleaned;

(f) said components of said self-cleaning arrangement including a sensor for inspecting said surfaces of said conveying means to determine whether or not said surfaces are clean.

10. The machine of claim 9 wherein said components of said self-cleaning arrangement include at least one nozzle for injecting a cleaning medium upon said surfaces of said conveying means.

11. The machine of claim 10 wherein said components of said self-cleaning arrangement further include at least one brush for contacting said surfaces of said conveying means.

12. The machine of claim 11 wherein said components of said self-cleaning arrangement further include at least one fan for blowing air to dry said surfaces of said conveying means that have been cleaned by said cleaning medium injected from said nozzle.

13. The machine of claim 10 wherein said components of said self-cleaning arrangement include an elongated tub underlying said nozzle and said conveying means for collecting and conducting away cleaning medium that has been contaminated by the cleaning of said surfaces of said conveying means.

14. The machine of claim 10 wherein said components of said self-cleaning arrangement include an elongated tubular envelope encapsulating said nozzle and said conveying means so as to screen remaining areas of said machine that are not to be cleaned from contact by said cleaning medium.

15. The machine of claim 12 wherein said components of said self-cleaning arrangement are also integrated with said container detection unit and are operable at selected times to clean components of said container detection unit which include optical devices employing light beams for inspecting the empty containers.

16. The machine of claim 14 wherein a lower portion of said elongated tubular envelope forms an elongated tub that underlies said nozzle and said conveying means for collecting and conducting away cleaning medium that has been contaminated by the cleaning of said surfaces of said conveying means.

17. The machine of claim 9 wherein said surfaces of said conveying means to be cleaned are provided with a dirt-repellant coating.

18. An automatic empty container return machine, comprising:

(a) a container detection unit having components operable for identifying whether or not an empty container is of a predetermined category;

(b) a container input unit located upstream of said container detection unit for receiving empty containers to supply the empty containers to said container detection unit;

(c) a container output unit located downstream of said container detection unit for receiving empty containers that have been identified by said container detection unit as being of the predetermined category;

(d) a container transport stage having means for conveying empty containers from said container input unit through said container detection unit to said container output unit, said conveying means having surfaces; and (e) a self-cleaning arrangement having components integrated with at least said conveying means of said container transport stage and being operable at selected times to clean said surfaces of said conveying means that are preselected to be cleaned;

(f) said components of said self-cleaning arrangement including (i) at least one nozzle for injecting a cleaning medium upon said surfaces of said conveying means, and (ii) an elongated tubular envelope encapsulating said nozzle and said conveying means so as to screen remaining areas of said machine that are not to be cleaned from contact by said cleaning medium;

(g) said components of said self-cleaning arrangement being also integrated with said container detection unit and operable at selected times to clean components of said container detection unit which include optical devices employing light beams for inspecting the empty containers, at least portions of said tubular envelope through which the light beams pass being made of light-transmissive material.

* * * * *